UNITED STATES PATENT OFFICE.

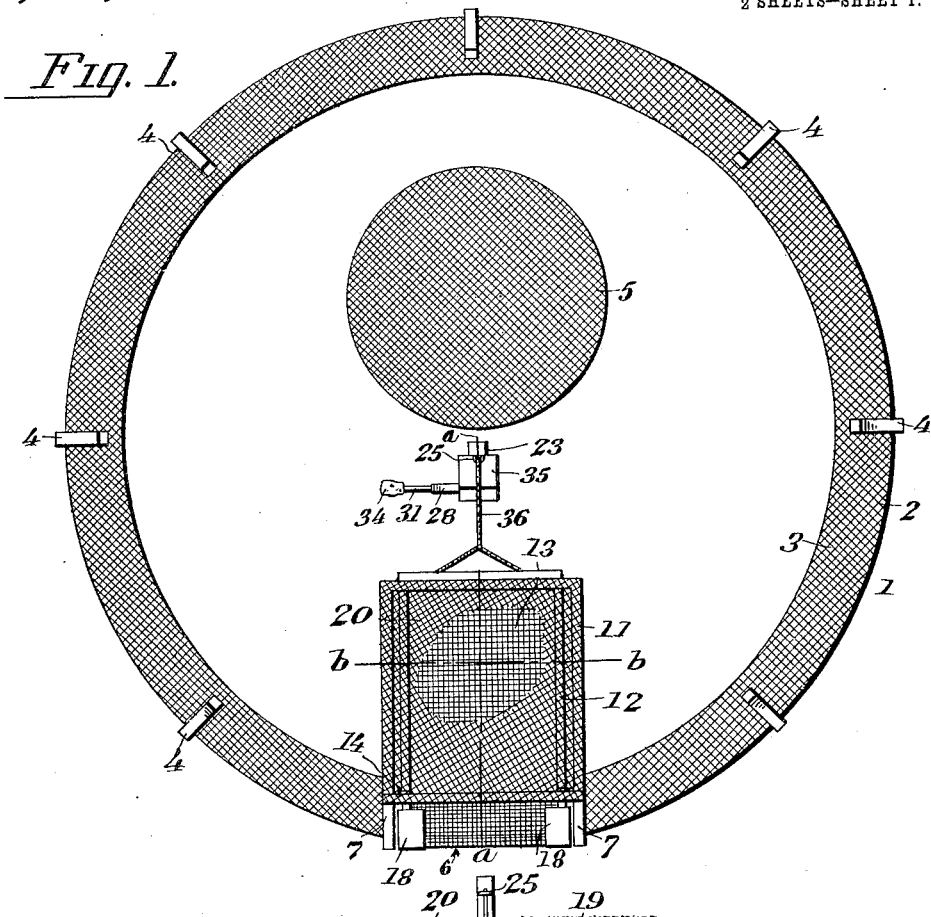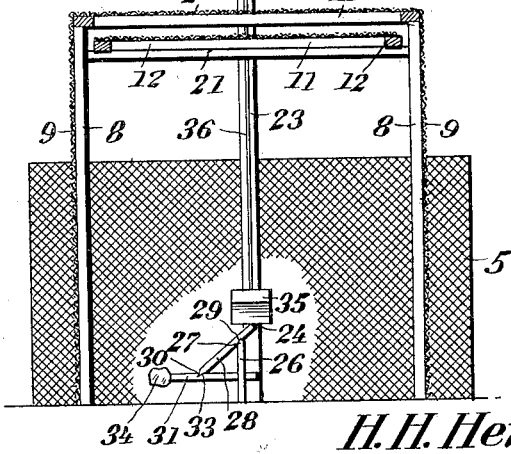

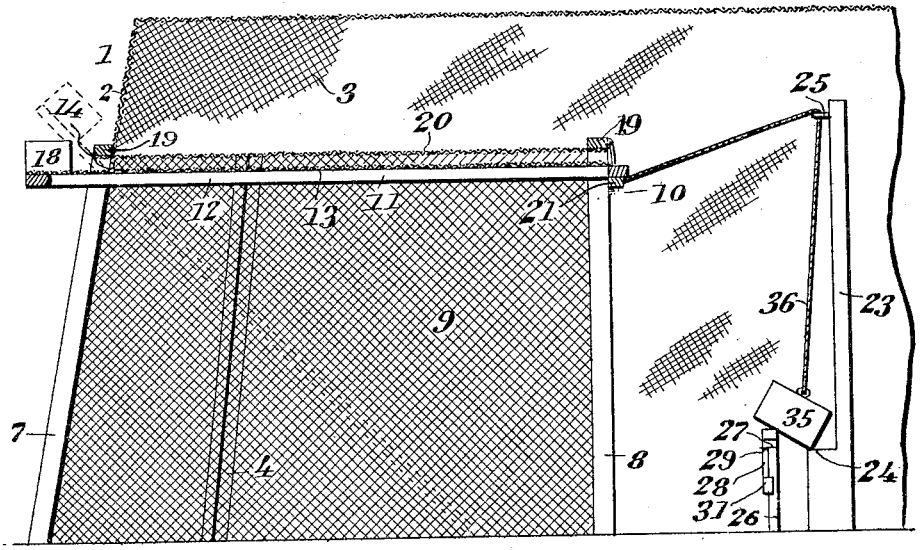
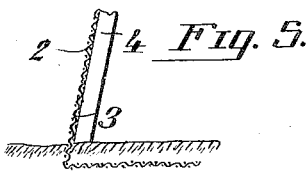
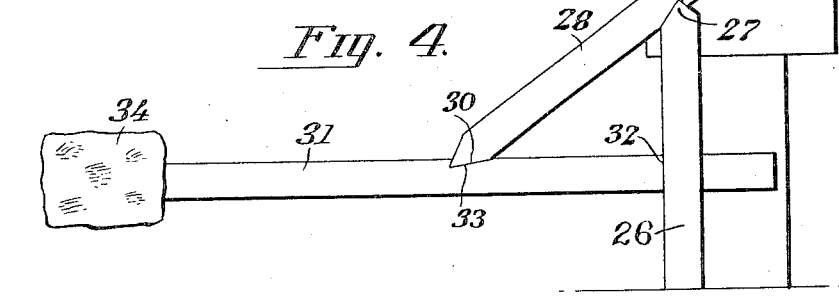

HENRY H. HERRING, OF ATASCOSA, TEXAS.

ANIMAL-TRAP.

1,088,988.

Specification of Letters Patent.

Patented Mar. 3, 1914.

Application filed July 23, 1913. Serial No. 780,737.

*To all whom it may concern:*

Be it known that I, HENRY H. HERRING, a citizen of the United States, residing at Atascosa, in the county of Bexar and State of Texas, have invented new and useful Improvements in Animal-Traps, of which the following is a specification.

This invention is an improved animal trap which may be made of any suitable size and adapted for trapping all kinds of animals, which may be attracted by bait, the invention consisting in the construction, combination and arrangement of devices hereinafter described and claimed.

In the accompanying drawings:—Figure 1 is a plan of an animal trap constructed in accordance with my invention. Fig. 2 is a vertical sectional view of the same on the plane indicated by the line *a—a* of Fig. 1, and showing the trap door open. Fig. 3 is a transverse sectional view of the same on the plane indicated by the line *b—b* of Fig. 1. Fig. 4 is a detail elevation on a larger scale of the means for supporting and for releasing the door. Fig. 5 is a detail sectional view showing the lower portion of the wall embedded in the earth.

In accordance with my invention, I provide an inclosure 1, the wall 2 of which is here shown as circular and comprising a wire mesh fabric 3 and suitably spaced posts 4. The posts incline inwardly and terminate short of the upper edge or side of the wire mesh fabric. The wire fabric is placed on the inner sides of the posts and the lower portion of this fabric is turned inwardly from the posts and bears on and is secured to the ground, to prevent an animal in the trap from digging out under the wall and so escaping.

In practice, in traps of sufficient size to trap such animals as wild cats and wolves, the said wire fabric extends usually about two feet above the tops of the posts to prevent animals from climbing up the posts and over the wall in an effort to escape from the trap. In the center of the trap is a bait cage 5 the wall and cover of which are also preferably made of wire mesh fabric and in this bait trap live bait such as chickens, or the like may be placed.

The trap is provided with at least one inlet 6, which I call a chute. In practice, there may be any suitable number of these chutes, arranged radially. Posts 7 are at the sides of the chute at its outer end and posts 8 are at the sides of the chute at its inner end, the walls 9 of the chute being also preferably made of wire mesh fabric. The posts 8 are provided on their inner sides at a suitable distance from their upper ends with stops or recesses 10 which, in practice, may be formed by driving staples of suitable size, flat side up, in the said posts.

The chute is provided with a trap door 11 which is here shown as comprising a frame 12 covered with wire mesh material 13, the size of the said trap door corresponding substantially with the longitudinal and transverse dimensions of the chute so that the door is arranged to be hung in the chute and to open or close the same. At its outer end the trap door projects beyond the posts 7 a suitable distance, and hinges 14 are employed to connect the door to said posts so that the door may be raised and lowered. On the projecting outer end of the gate are suitable weights 18 which tend to partly counter-balance the gate but are not of sufficient weight to raise the inner end thereof. The posts are connected at their upper ends by a cross bar 19 and the said cross bar is connected by wire mesh fabric 20 to the hinged or outer end of the gate so that when the latter is in closed position, the fabric 20 forms an inclosed wall between the walls 9 and prevents animals from running up on the gate and out through the chute and, hence, escaping from the trap by such means. The chute may, however, if preferred, be provided with a covering or roof of wire mesh or other suitable fabric or material, for this purpose.

A supporting bar 21 is provided to support the gate in raised open position, the supporting bar being adapted to be placed on the rests 10 on the inner sides of the posts 8.

Opposite and spaced from the inner end of the chute is a post 23 which has a supporting shoulder or device 24 on the side opposed to the chute at a suitable distance from its lower end and is provided near its upper end with a ring 25 or other suitable guide. At a suitable distance from the post is a vertical standard 26, the upper end of which is pointed as at 27. In connection with this standard I employ a releasing bar 28 which has a notch 29 at a suitable distance from its upper end adapted to be engaged by the point 27 of the standard and has its lower end beveled and pointed as at 30. I also provide a trigger bar 31 which has a notch 32 in one side adapted to engage the standard and is provided near one end with a notch 33 on its upper side adapted to be engaged by the pointed end 30 of the releasing bar 28, the extended end of the trigger bar on the same side of the standard as the releasing bar 28 being adapted to hold a suitable bait here indicated at 34.

A weight 35 is provided to trip the supporting bar 21 and permit the trap door to fall. This weight is connected to the supporting bar by a cord 36 which passes through the guide 25 and when the trap is set the weight rests partly on the shoulder 24 of the post 23 and partly on the upper end or arm of the releasing bar 28, the pressure of the said weight on the said releasing bar holding the latter in engaged position with respect to the standard 26 and said releasing arm exerting such outward pressure or tension on the trigger bar 31 as to keep the latter with its notch 32 engaged by the said standard so that the trigger bar is held by the weight and by the standard and releasing bar in normal horizontal set position, as indicated in Fig. 4.

When an animal enters the trap through the chute and under the gate and brushes against the trigger bar 31 or bites the bait 34 thereon, such movement causes the trigger bar to unship or disengage its notch 32 from the standard 26, and thereupon the pressure of the weight on this bar 28 throws the trigger bar with its bait away from the posts and releases the bar 28, and the weight 35 is caused to drop from said bar 28 and supporting shoulder 24 and to jerk the cord 36 and, hence, cause the said cord to pull the supporting bar 21 from under the free end of the gate and off the rests 10 of the posts 8, thus causing the gate to drop to an inclined closed position, as will be understood.

Where the trap is of such dimensions as to be provided with a plurality of entrance chutes and trap doors, the supporting bar of each trap door will be connected by a cord to the weight 35 so that when the weight drops it will simultaneously release all of the trap doors and thus close all exits from the trap.

I claim:—

A trap of the class described having a wall provided with an entrance chute extending inwardly into the trap, said chute having posts at the inner ends of its side walls and stops at elevated points on said posts, a trap door hingedly connected near one end to a cross bar at the outer end of the entrance chute, the said door being adapted to close downwardly and lie in an inclined position in the chute, a supporting bar for the trap door, to lie in the stops of the posts and to support the door in elevated, open position, a weight, a cord connecting the said weight to the supporting bar, means including a releasing element to support the said weight in elevated position and a trigger to hold the releasing element in set up position and to release said releasing element and cause the weight to drop when the trigger is moved.

In testimony whereof I affix my signature in presence of two witnesses.

HENRY H. HERRING.

Witnesses:
LAURA BYWATERS,
E. R. WISDOM.